United States Patent [19]

Tomomoto et al.

[11] 4,259,231
[45] Mar. 31, 1981

[54] ONE-PART CURABLE ELASTIC SEALANT

[75] Inventors: Takanori Tomomoto; Kihachi Suzuki; Shin-ichi Oda; Toshimitsu Okuno, all of Ibaraki, Japan

[73] Assignee: Nitto Electric Industrial Co., Ltd., Ibaraki, Japan

[21] Appl. No.: 31,700

[22] Filed: Apr. 19, 1979

[30] Foreign Application Priority Data

Apr. 19, 1978 [JP] Japan .................................. 53-46878

[51] Int. Cl.³ .......................... C08K 5/16; C08G 18/12
[52] U.S. Cl. .................................... 260/42.52; 528/75
[58] Field of Search ........................ 260/42.52, 37 N; 528/75

[56] References Cited

U.S. PATENT DOCUMENTS

| | | | |
|---|---|---|---|
| 3,036,045 | 5/1962 | Short et al. | 528/75 X |
| 3,284,415 | 11/1966 | Horvath | 528/75 X |
| 3,425,988 | 2/1969 | Gormon et al. | 528/75 X |
| 4,123,412 | 10/1978 | Fukuda | 260/37 N X |

FOREIGN PATENT DOCUMENTS

| | | | |
|---|---|---|---|
| 48-12871 | 4/1973 | Japan | 528/75 |
| 48-42069 | 11/1973 | Japan | 528/75 |

*Primary Examiner*—Lewis T. Jacobs
*Assistant Examiner*—Robert E. L. Sellers
*Attorney, Agent, or Firm*—Sughrue, Rothwell, Mion, Zinn and Macpeak

[57] ABSTRACT

A one-part curable elastic sealant comprising a dehydrated blend of (I) 100 parts by weight of an acrylic isocyanate elastomer having free isocyanate groups in the molecules, (II) about 0.1 to 15 parts by weight of a reaction promoting catalyst, and (III) about 30 to 200 parts by weight of a filler; said acrylic isocyanate elastomer being the reaction product of an acrylic low molecular weight copolymer with about two equivalents of an organic diisocyanate based on the functional groups in the acrylic low molecular weight copolymer said acrylic low molecular weight copolymer being prepared by copolymerizing (a) an ethylenically unsaturated monomer having a functional group capable of reacting with an organic diisocyanate compound, with (b) an unsaturated monomer of the general formula

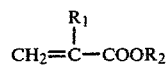

wherein $R_1$ represents a hydrogen atom or a methyl group, and $R_2$ represents a straight or branched chain alkyl group having 2 to 14 carbon atoms, in the presence of a polymerization initiator having a functional group whose reactivity with the isocyanate compound is equal to or higher than that of the functional group of the monomer (a), and/or a chain transfer agent similarly having a functional group whose reactivity with the isocyanate compound is equal to or higher than that of the functional group of the monomer (a), the mole ratio of monomer (a) to monomer (b) being about 1:5 to 1:500, and the amount of said polymerization initiator and/or chain transfer agent being about 0.1 to 20 parts by weight per 100 parts by weight of monomer (b).

20 Claims, No Drawings

ONE-PART CURABLE ELASTIC SEALANT

BACKGROUND OF THE INVENTION

1. Field of the Invention

This invention relates to a one-part or commonly known as a "one-package" curable elastic sealant which contains as a main ingredient an acrylic isocyanate elastomer having free isocyanate groups in the molecule, and which is curable in the presence of the moisture in the air.

3. Description of the Prior Art

Sealants filling the joints of buildings and the like must have the elastic property which permits them to expand and contract according to dimensional variations in the building materials constituting the joints due to temperature changes. Moreover, they desirably do not contain materials such as water and organic solvents which scatter into the atmosphere or evaporate causing dimensional reductions in the fillings.

Frequently used polyacrylic sealants, generally, have superior weatherability, colorability and durability, but to data such sealants have been obtained only as non-crosslinked non-elastic emulsions or organic solvent solutions. Hence, such sealants cannot adjust to dimensional changes in the joint which may be caused by temperature changes, etc. Consequently, cracks or gaps tend to occur in the joints, and water, organic solvents, etc. scatter or evaporate into the air. As a result, the sealant shrinks with time, and does not perform adequately. For this reasons, the utility of such sealants is limited, and presently they are used only in ALC (Autoclaved Lightweight Concrete) boards and the like.

Many of elastic sealants now commercially available are two-part curable. That is the sealant is supplied to the user in two parts which must be mixed by the user prior to use. However, these two-part curable elastic sealants tend to exhibit poor adhesion and curing as a result of weighing errors, nonuniform mixing, etc. which occur during the mixing of the two packages. Moreover, once the two packages have been mixed, the mixture cannot be stored and any unused portion is wasted. Thus, the efficiency of this type of sealant is very poor.

A one-part curable sealant of the urethane type obtained by the polyaddition reaction between a polyisocyanate and a polyol such as polyethylene glycol is known which does not suffer from the drawbacks of the two-part curable sealant.

SUMMARY OF THE INVENTION

It is an object of this invention to provide a new type of an elastic sealant, which is a one-part curable elastic sealant which functions equal to or better than a urethane-type sealant in which the resinous component is a polyacrylic resin having superior weatherability and durability.

It is another object of this invention to provide an acrylic isocyanate elastomer having free isocyanate groups in the molecules which is a suitable one-part sealant by a unique synthesis method.

It is still another object of the present invention to provide a sealant which is suitable for use in filling joints and which is capable of adjusting to dimensional variations in the building materials caused by temperature changes.

Because of acrylic isocyanate elastomer of the present invention has free isocyanate groups in the molecule, it can be converted into a linear and crosslinked high molecular weight polymer having superior properties upon reaction with the moisture in the air.

Further investigations have led to the discovery that the aforesaid acrylic isocyanate elastomer is very suitable as a novel one-part curable elastic sealant which does not lose materials such as water and solvent and can be used under severe conditions (i.e., marked temperature changes at all times of the year such as from $-30°$ to $70°$ C.).

According to this invention, there is provided a one-part curable elastic sealant comprising a dehydrated blend of (I) 100 parts by weight of an acrylic isocyanate elastomer having free isocyanate groups in the molecules, (II) about 0.1 to 15 parts and preferably about 0.5 to 5 parts by weight of a reaction promoting catalyst, and (III) about 30 to 200 parts and preferably about 80 to 150 parts by weight of a filler;

said acrylic isocyanate elastomer being the reaction product of an acrylic low molecular weight copolymer with about two equivalents, based on the functional groups in the acrylic low molecular weight copolymer, of an organic diisocyanate, said acrylic low molecular weight copolymer being prepared by copolymerizing (a) an ethylenically unsaturated monomer having a functional group capable of reacting with an organic diisocyanate compound with (b) an unsaturated monomer of the general formula

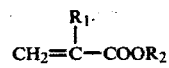

$$CH_2=\overset{R_1}{\underset{|}{C}}-COOR_2$$

wherein $R_1$ represents a hydrogen atom or a methyl group, and $R_2$ represents an alkyl group having 2 to 14 carbon atoms [up to about 50% of monomer (b) based on the weight ratio of (a) to (b), may be replaced by another copolymerizable unsaturated monomer], in the presence of a polymerization initiator having a functional group whose reactivity with the isocyanate compound is equal to or higher than that of the functional group of monomer (a), and/or a chain transfer agent having a functional group whose reactivity with the isocyanate compound is equal to or higher than that of the functional group of monomer (a). The functional group of the polymerization initiator and/or chain transfer agent may be the same as the functional group in monomer (a). The mole ratio of monomer (a) to monomer (b) being about 1:5 to 1:500, and the amount of said polymerization initiator and/or chain transfer agent being about 0.1 to 20 parts by weight per 100 parts by weight of the monomer (b). The acrylic low molecular weight copolymer has on the average about one functional group derived from said polymerization initiator and/or chain transfer agent at the end of the polymer molecule and about one functional group derived from the monomer (a) at an arbitrary position within the polymer molecule, both of these functional groups being capable of participating in the reaction with the isocyanate compound.

DETAILED DESCRIPTION OF THE INVENTION

The acrylic isocyanate elastomer used in this invention is synthesized by the method described above, and is normally liquid at normal temperature and pressure.

A sealant obtained by mixing the acrylic isocyanate elastomer as a main ingredient with a reaction promoting catalyst and a filler does not shrink after application because its viscosity which is determined by its ability to be extruded can be adjusted to the one feasible for application without using an organic solvent such as xylene, toluene or the like.

In addition, since this acrylic isocyanate elastomer has free isocyanate groups in the molecule, it reacts with moisture in the air after application and is converted to a linear and crosslinked high molecular weight polymer having rubber-like physical properties. Thus, mixing two packages as in conventional elastic sealants is not required, and problems such as poor adhesion and poor curing which are due to weighing errors and non-uniformity during mixing are avoided. Thus, it has the advantage of possessing good storage stability.

The aforesaid high molecular weight polymer essentially differs from known urethane-type polymers, and has good weatherability, durability and heat resistance inherent to polyacrylic polymers and also possesses elasticity. Accordingly, it adjusts to variations in the joint width which may occur due to temperature changes.

The acrylic low molecular weight copolymer used to synthesize the acrylic isocyanate elastomer in this invention is produced by copolymerizing (a) an ethylenically unsaturated monomer having a functional group capable of reacting with an organic diisocyanate compound [to be referred to as monomer (a)] with an unsaturated monomer of the general formula (I)

$$CH_2=\overset{R_1}{\underset{|}{C}}-COOR_2 \qquad (I)$$

wherein $R_1$ represents a hydrogen atom or a methyl group, and $R_2$ represents an alkyl group containing 2 to 14 carbon atoms, [to be referred to as monomer (b)] in the presence of a polymerization initiator having a functional group and/or a chain transfer agent. The functional group of the initiator may be the same as that of monomer (a) or different from that of monomer (a) as long as its reactivity with the isocyanate compound is equal to or higher than that of the functional group of monomer (a). The chain transfer agent may have a functional group similarly defined with respect to that of monomer (a). The mole ratio of monomer (a) to monomer (b) is about 1:5 to 1:500 and the amount of the polymerization initiator and/or chain transfer agent is about 0.1 to 20 parts by weight per 100 parts by weight of monomer (b). The resulting copolymer has an average of one functional group derived from the polymerization initiator and/or chain transfer agent introduced at the end of its molecule and an average of one functional group derived from the monomer (a) introduced at an arbitrary position within the molecule.

While the resulting copolymer has on the average one functional group derived from the polymerization initiator and/or chain transfer agent and one functional group derived from monomer (a) it will be apparent to one skilled in the art that the resulting copolymer in reality is a mixture including some copolymers which may have no functional group or at least one functional group introduced at the end or within the polymer chain.

Introduction of about one functional group on an average into the end of the polymer molecules also embraces the cases where no functional group is introduced into the end of molecules, or where one functional group is introduced into each of the two ends, although the probability of such cases is very low. For example, in the former case, when a polymerization initiator containing no functional group and a chain transfer agent having a functional group are used and polymerization is terminated by hydrogen extraction of the chain transfer agent having, for example the -SH group, a copolymer is sometimes formed at the initial stage of polymerization which does not have a functional group introduced both into the polymerization initiation end and into the polymerization termination end. As an example of the latter, a polymer radical having a functional group at the polymerization initiation end induces a termination reaction by coupling.

However, since in the example of the former, the residue of the chain transfer agent containing a functional group resulting from hydrogen extraction continues to act as a polymerization initiating radical, the aforesaid functional group is conducted to the polymerization initiating end, and this reaction generally constitutes a main course of the polymerization reaction. Thus, the proportion of a copolymer having no functional group is very low on the whole. Furthermore, the stopping reaction by coupling in the example of the latter seldom occurs in the radical polymerization of acrylic monomers in general, and usually, a stopping reaction based on chain transfer constitutes a main reaction. Hence, the proportion of a copolymer having a functional group at both ends is low on the whole.

Introduction of about one functional group on an average into an arbitrary position within the polymer molecules denotes not only the case in which one functional group derived from the monomer (a) is introduced, but also the cases in which no functional group is introduced, or two or more functional groups are introduced. Since the average number of the functional groups introduced is about 1, the number can be relatively easily adjusted according to the ratio of copolymerizability or the reaction conditions, and the degree of variations in the number of the functional groups becomes small.

Thus, the low molecular weight copolymer used in this invention contains an average of about two functional groups which are derived from the monomer (a) and the polymerization initiator and/or chain transfer agent respectively. When this copolymer is reacted with an organic diisocyanate compound, an acrylic isocyanate elastomer can be obtained in which the diisocyanate is introduced at, on the average, one end of the molecule and into an arbitrary position within the molecule. The isocyanate elastomer is converted to a linear high molecular weight polymer upon reaction with moisture whereupon the molecular chain is suitably crosslinked. The high molecular weight product has superior elongation characteristics.

The monomer (a) is an ethylenically unsaturated monomer containing at least one functional group (in some cases, two functional groups) capable of reacting with the organic diisocyanate compound. Examples of the aforesaid functional group include a carboxyl group, a hydroxyl group, an amino group, etc. Specific examples of the monomer (a) include acrylic acid, methacrylic acid, maleic anhydride, 2-hydroxyethyl acrylate, 2-hydroxyethyl methacrylate, 2-hydroxypropyl acrylate, 2-hydroxypropyl methacrylate, polyethylene glycol acrylate (methacrylate), N-methylol acrylamide, N-methylol methacrylamide, N-methylaminoethyl acrylate, N-methylaminoethyl methacrylate and N-t-butylaminoethyl methacrylate. These monomers are used alone or as a mixture of two or more having equivalent reactivity with the organic diisocyanate compound.

The proportion of the monomer (a) is such that the mole ratio of monomer (a) to monomer (b) is from about 1:5 to 1:500. It is determined considering the degree of polymerization and the copolymerization reactivity ratio of these monomers so that about one functional group on an average capable of reacting with the organic diisocyanate compound is introduced into an arbitrary position within the polymer molecules.

The monomer (b) is an alkyl acrylate or methacrylate of the general formula

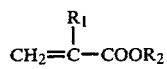

wherein $R_1$ represents a hydrogen atom or a methyl group, and $R_2$ represents alkyl group containing 2 to 14 carbon atoms. Preferably the alkyl group is straight or branched chain. At least one such monomer is used.

Specific examples of the alkyl group are ethyl, n-butyl, isobutyl, 1-ethylpropyl, 1-methylpentyl, 2-methylpentyl, 3-methylpentyl, 1-ethylbutyl, 2-ethylbutyl, iso-octyl, 3,5,5-trimethylhexyl, decyl, and dodecyl. When the alkyl group contains more than 14 carbon atoms, the resulting elastic sealant composition has unsatisfactory adhesion to joint materials in building materials, etc.

In the present invention, up to about 50% by weight of the monomer (b) can be replaced by another unsaturated monomer copolymerizable with monomer (a). Examples of the other copolymerizable unsaturated monomer include ethylenically unsaturated compounds such as vinylpyridine, vinylethers such as methylvinyl ether, ethylvinyl ether, n-butylvinyl ether or 2-ethylhexylvinyl ether, acrylonitrile, methacrylonitrile, α or β-methylene glutaronitrile, methyl methacrylate, N,N-dimethylaminoethyl acrylate, vinyl halides, butadiene, chloroprene, styrene, acrylamide, vinylpyrrolidone, cyclohexyl acrylate, glycidyl acrylate, β-ethoxyacrylate, vinyl acetate, sulfonyl acrylate, mono(2-hydroxyethyl-α-chloroacrylate) acid phosphate, and fluoroalkyl acrylates. The type and amount of such an unsaturated monomer are determined according to the use of the resulting sealant. However, if the proportion of this other monomer is more than half of the total amount of the monomer (b), the aforesaid properties of the acrylic sealant are likely to be impaired.

Examples of the polymerization initiator having a functional group capable of reacting with the organic diisocyanate are azobiscyanovalerianic acid, peroxyoxalic acid and azobiscyanopentanol having a carboxyl group or a hydroxyl group as the functional group.

The chain transfer agents having a functional group capable of reacting with the organic diisocyanate compound broadly include compounds which have a carboxyl group, a hydroxyl group, an amino group, etc. as the functional group and which effectively act as a chain transfer agent for the copolymerization. Typical examples are 2-mercaptoacetic acid, 2-mercaptoethanol, 2-aminoethane thiol, and trichloroacetic acid.

In the present invention, among the aforesaid polymerization initiators and/or chain transfer agents, at least one compound having the same kind of functional group as the functional group of monomer (a) or having a different functional group whose reactivity with the organic diisocyanate compound is equal to or higher than that of the functional group of monomer (a) is selected. The amount of the initiator and/or chain transfer agent should be such that about one functional group on the average participates in the reaction with the organic diisocyanate compound and the degree of polymerization of the polymer is suitable. The polymer preferably has a number average molecular weight of about 3,000 to 70,000. If the molecular weight is less than about 3,000, the sealants do not have sufficient strength and elasticity, particularly elongation. If, on the other hand, the molecular weight is larger than about 70,000, the extrudability becomes poor. Therefore, the amount of initiator and/or chain transfer agent is selected such that the copolymer is in this molecular weight range. The initiator and/or chain transfer agent is generally 0.1 to 20 parts by weight per 100 parts by weight of the monomer (b).

The low molecular weight copolymer in accordance with this invention is produced by copolymerizing the monomers (a) and (b) in a customary manner in the presence of the aforesaid polymerization initiator and/or chain transfer agent. The polymerization is a free radical polymerization and an ordinary free radical initiator (hereafter "ordinary initiator") such as benzoyl peroxide, α, α'-azobisisobutyronitrile or a redox system can be used. When the aforesaid polymerization initiator is used in order to introduce the functional group to be reacted with the organic diisocyanate compound into the end of the molecule, it also acts as a polymerization initiating catalyst. Thus, the amount of the latter free radical initiator can be slight or it need not be present at all.

In polymerization, the monomeric mixture may be charged at one time at the beginning of the polymerization. Alternatively, a part of it may be charged at the outset and the remainder added dropwise as the polymerization reaction proceeds. The polymerization initiator and/or chain transfer agent having the aforesaid functional group, and optionally the ordinary initiator may be charged in the same manner. When part of such agents is added, the remainder is preferably used dissolved in the monomeric mixture. Desirably, the polymerization should be performed in bulk without using a solvent. However, when the use of a solvent is particularly required, a solvent such as n-heptane, toluene, n-hexane, dioxane, benzene, methyl ethyl ketone, methyl isobutyl ketone, ethyl acetate and isopropanol may be used.

The reaction temperature differs according to the type of the monomer and the polymerization initiator, but generally, a suitable reaction temperature is about 50° to about 90° C. If the polymerization temperature becomes too high, and heat generation becomes too vigorous, it is suitably controlled by such a means as water cooling.

The polymerization time depends mainly on the polymerization temperature and the type of the monomers. The end point of the reaction is determined so that the amounts of the unreacted monomers are minimized and a gel-like product does not occur. Usually, it is convenient to set the time at which heat generation stops, as the end point of the reaction.

The resulting copolymer has an average of about one functional group derived from the polymerization initiator and/or the chain transfer agent and one derived from the monomer (a) at the end of the polymer molecule and at an arbitrary position within the molecule.

The organic diisocyanate has the ability to be chain-lengthened or crosslinked to form a high molecular weight material in the presence of the moisture in the air. Examples of the organic diisocyanate compound to be reacted with the low molecular weight copolymer are aromatic, aliphatic or alicyclic organic diisocyanates. Specific examples of the organic diisocyanate compound are 4,4'-diphenylmethane diisocyanate, 3,3'-dimethyl-4,4'-diphenylmethane diisocyanate, 4,4'-cyclohexylmethane diisocyanate, tolylene diisocyanate, hexamethylene diisocyanate, xylylene diisocyanate, p-phenylene diisocyanate, m-phenylene diisocyanate, 4,4'-isopropylidene dicyclohexyl isocyanate, and isophorone diisocyanate. At least one of these organic diisocyanate compounds is used. The amount of the diisocyanate compound is about 2 times the equivalent amount of the functional group of the low molecular weight copolymer. By adjusting the equivalent ratio between the functional group in the low molecular weight copolymer and the isocyanate groups in the organic diisocyanate to about 1:1, free isocyanate groups are left at the ends of the molecules of the resulting acrylic isocyanate elastomer.

The low molecular weight copolymer is reacted with the organic diisocyanate in an ordinary manner. For example, a predetermined amount of the organic diisocyanate is charged into a reactor, and a predetermined amount of the acrylic low molecular weight copolymer is added dropwise with stirring. At this time, if the organic diisocyanate compound is a solid, a solvent such as toluene, ethyl acetate, methyl ethyl ketone or benzene is used, and it is reacted in the form of a solution.

The reaction temperature and the reaction time vary depending upon the type of the functional group and the type of the organic diisocyanate. Usually, the reaction is performed at room temperature to 150° C. for several hours to several tens of hours, e.g., about 2 to 30 hours.

In performing the aforesaid reaction, the acrylic low molecular weight copolymer is desirably subjected to a dehydration treatment in advance so as to reduce its moisture content to about 0.05% by weight or less based on the weight of the copolymer. The dehydration treatment may be carried out in an ordinary manner. For example, the dehydration can be easily effected by heating under reduced pressure, e.g., about 80° to 150° C. and about 0.5 to 50 mmHg. The measurement of the water content can be performed by a Karl-Fisher method. When the acrylic low molecular weight copolymer has a large water content, the water reacts with the organic diisocyanate, and the reaction between the acrylic low molecular weight copolymer and the organic diisocyanate does not proceed as desired. Thus, the desired acrylic isocyanate elastomer may not be obtained. It is recommended therefore to reduce the water content of the acrylic low molecular weight copolymer to 0.05% by weight or below before the reaction.

Since the acrylic isocyanate elastomer produced in the above manner has free isocyanate groups within the molecules, it can be cured with moisture in the air. Thus, it is used as a main material for the one-part curable elastic sealant of this invention.

The reaction promoting catalyst used in this invention is a catalyst capable of promoting the reaction of the free isocyanate groups in the acrylic isocyanate elastomer with moisture in the air, and various catalysts generally used for urethanization reaction can be used. Specific examples of preferred reaction promoting catalysts include organic metal compounds such as dibutyltin dilaurate, tin octylate and manganese octylate, monobutyltin oxide and dioctyltin dilaurate, amine compounds such as N,N-dimethylcyclohexylamine, tri-n-butylamine, triethylene diamine, N,N-dimethylbenzylamine and 1,8-diazobicyclo[5,4,6]undecene-7, and salts of such as hydrochlorides of the amine compounds. Desirably, the reaction promoting catalyst is added in an amount of 0.1 to 15 parts by weight per 100 parts by weight of the acrylic isocyanate elastomer. When the amount of the catalyst is less than 0.1 part by weight, the above effect of promoting the reaction is not sufficient. The reaction promoting effect increases with increasing amount of the catalyst, but is saturated when the amount is about 15 parts by weight. No further increase in the effect is noted even if the amount of the catalyst is increased further.

The filler used in this invention increases the strength of the elastic sealant of this invention and enhances the operability of the sealant by adjusting its viscosity to a suitable level. Preferred fillers are, for example, calcium carbonate, silica powder, talc, glass powder, magnesia, clay powder, and titanium oxide. The amount of the filler is suitably 30 to 200 parts by weight per 100 parts by weight of the acrylic isocyanate elastomer. If the amount is smaller, a sealant having the desired strength is difficult to obtain. If it is too large, the elongation of the cured product is low, and desired elastic properties are difficult to obtain. The filler has preferably a particle size of about 0.01 to 10$\mu$.

The one-part curable elastic sealant of this invention is obtained by fully mixing predetermined amounts of the acrylic isocyanate elastomer, the reaction promoting catalyst and the filler in an ordinary mixer, optionally adding compounding agents used for general sealants, such as pigments (e.g., titanium dioxide or carbon black), thixotropic agents (e.g., Disparlon #3600N and #305, products of Kusumoto Kasei K.K.), antioxidants (e.g., NOCRAC NS-6, a product of Ohuchi Shinko Kagaku K.K., IRGANOX 1010 and 1076, products of Ciba-Geigy AG), anti-proofing agents (e.g., 2-(4-thiazolyl)-benzimidazole, p-chloro-m-xylenol or $\alpha$-bromocinnamic aldehyde), ultraviolet absorbers (e.g., Tinuvin 327 and Tinuvin P, products of Ciba-Geigy AG), plasticizers (e.g., dioctyl phthalate or dioctyl adipate), ozone deterioration inhibitors (e.g., NOCRAC 810-NA and NS-10-N, products of Ohuchi Shinko Kagaku K.K.), and tackifiers (e.g., rosins, terpene resins or phenolformaldehyde resins), and subjecting the blend finally to a dehydration treatment.

The dehydration treatment can be performed by using an ordinary dehydration treatment method such as heating under reduced pressure (e.g., about 80° to 150° C. and 0.5 to 50 mmHg) or an azeotropic method. Generally, the water content of the blend should be reduced to 0.05% by weight or less based on the weight of the blend. When the blend contains more than 0.05% by weight of water, the water reacts with the isocyanate groups in the acrylic isocyanate elastomer before it is applied as a sealant, and the viscosity increases to degrade its operability. In the worst case, the mixture cures before use.

The dehydration treatment can also be performed by using a special moisture absorbing or drying agent such as silica gel. In this case, the storage stability of the acrylic isocyanate elastomer can be ensured without taking the trouble of removing from the blend the additive having the water absorbed therein.

The following Examples illustrate the present invention more specifically. All parts and percents, ratios, etc. in these examples are by weight unless otherwise indicated. These examples are not to be construed as limiting.

EXAMPLE 1

One hundred parts of n-butyl acrylate, 3.4 parts of 2-hydroxyethyl acrylate and 2.2 parts of 2-mercaptoethanol were mixed, and 30% of the resulting mixture was fed into a 200 cc four-necked flask. With stirring, the mixture in the flask was heated to 70° C. while flowing nitrogen through it. After purging the inside of the flask with nitrogen for about 30 minutes, 0.1 part of $\alpha,\alpha'$-azobisisobutyronitrile was added. In about 12 minutes, polymerization began, and heat was generated. After the heat generation subsided, 0.2 part of $\alpha,\alpha'$-azobisisobutyronitrile was added to the remaining 70% of the above mixture. The mixture was added dropwise to the flask by means of a dropping funnel. The time of addition was 3 hours and the polymerization was terminated when heat generation was no longer observed.

The resulting acrylic low molecular weight copolymer had a solids content (after drying at 130° C.) of 100%, a viscosity (by a B-type viscometer) of 100 poises (30° C.), and a number average molecular weight (determined by a vapor pressure osmosis) of 6,300, and contained 2.1 hydroxyl groups (determined from the acetyl value and the molecular weight) per molecule.

The low molecular weight copolymer was subjected to a dehydration treatment by heating at 140° C. under reduced pressure of 3 mmHg for 3 hours. 140 Parts of the dehydrated low molecular weight copolymer was added dropwise to a separate 200 cc four-necked flask containing 10.9 parts of tolylene diisocyanate, and they were reacted at 130° C. for 7 hours.

The resulting acrylic isocyanate elastomer had an isocyanate content (determined with dibutylamine) of 2.2%.

One hundred parts of the resulting isocyanate elastomer was pre-mixed with 95 parts of calcium carbonate, 10 parts of dioctyl phthalate, 4 parts of DISPARLON 3600N (a product of Kusumoto Kasei K.K.), 12 parts of triethylamine and 0.8 part of IRGANOX 1010 (a product of Ciba-Geigy AG) using a kneader. They were further mixed on a three-roll mill. The mixture was again placed in the kneader, and heated at 140° C. under reduced pressure of 15 mmHg until the total water content of the mixture became 0.02%. Thus, the one-part curable elastic sealant of this invention resulted.

The resulting sealant was coated to a thickness of 2 mm on a separator, and allowed to stand for 7 days in a room kept at a temperature of 20° C. and a relative humidity of 65%. The tensile strength and elongation of the resulting sheet-like structure were measured by using an Instron-type Universal Testing Machine (a product of Shimazu Seisakusho) at a temperature of 20° C. and a speed of 5 mm/min. It was found that the sheet-like structure had a maximum strength of 6.4 kg/cm$^2$ and an elongation of 710%. Thus, the elastic sealant of this invention can be cured with moisture in the air, and the cured product has rubber elasticity showing a very high elongation and flexibility.

The properties of the above elastic sealant were measured in accordance with JIS A-5757. The results were: slump 0; contamination none; breezing 0; ignition loss 1.2%; extrudability 3 seconds.

The above results demonstrate that the elastic sealant of this invention has good properties as a one-part curable elastic sealant.

EXAMPLE 2

A mixture of 100 parts of ethyl acrylate, 2.4 parts of acrylic acid and 3 parts of 2-mercaptoacetic acid was prepared. Twenty parts of DIACIZER-D-160 (a product of Mitsubishi Monsanto Chemical Co., Ltd.) was placed in a 200 cc four-necked flask, and 20 parts of the above mixture was added. While stirring the contents of the flask, the flask was purged with nitrogen. The inside bath was heated to 70° C. After purging with nitrogen for about 60 minutes, 0.1 part of azobiscyanovalerate was added dropwise to the contents of the flask by means of a dropping funnel. The dropping time was 3 hours, and the polymerization was terminated when heat generation was no longer observed.

The resulting low molecular weight copolymer had a polymerization conversion of 98.7%, and a viscosity of 170 poises at 30° C. (containing DIACIZER D-160), and contained 2.1 carboxyl groups (determined from the molecular weight and the acid value) per molecule.

A four-necked flask was charged with 125.4 parts of the resulting low molecular weight copolymer, and 17.5 parts of diphenylmethane diisocyanate and 3 parts of triethylenediamine were added. With stirring, they were reacted at 130° C. for 10 hours. The resulting isocyanate elastomer had an isocyanate content of 2.3%.

One hundred parts of the resulting isocyanate elastomer was mixed with 80 parts of calcium carbonate, 15 parts of titanium dioxide, 4 parts of DISPARLON 305 (a product of Kusumoto Kasei K.K.), 2 parts of triethylenediamine, 0.2 part of carbon black and 0.5 part of Tinuvin 327 (a product of Ciba-Geigy AG). They were fully kneaded by using a kneader and a three-roll mill in the same way as in Example 1, and then dehydrated in the same way as in Example 1 to form a one-part curable elastic sealant of this invention.

The elastic sealant was coated to a thickness of 2 mm on a separator, and allowed to stand for 7 days in a room kept at a temperature of 20° C. and a relative humidity of 65%. The properties of the resulting sheet-like structure were measured in the same way as in Example 1. The results were as follows:
Maximum strength: 4.6 kg/cm$^2$
Elongation: 530%
Slump: 0 mm
Contamination: none
Breezing: 0
Ignition loss: 0.9%
Extrudability: 4.2 seconds The results show that this elastic sealant has good properties as a one-part curable elastic sealant.

EXAMPLES 3 TO 5

Three low molecular weight copolymers were prepared in the same way as in Example 1 in accordance with the formulations shown in Table 1. The polymerization conversions, viscosities, the number of functional groups per molecule, and the types of the functional groups are shown in Table 1.

TABLE 1

| | Example 3 | Example 4 | Example 5 |
|---|---|---|---|
| Ingredients | Lauryl acrylate (100 parts) | Butyl acrylate (100 parts) | Octyl acrylate (100 parts) |
| | Methacrylic acid (2.5 parts) | N,N-dimethyl-aminoethyl-acrylate (20 parts) | Vinyl acetate (60 parts) |
| | Peroxyoxalic acid (0.5 part) | N-methylamino-ethyl acrylate (6 parts) | Acrylic acid (5 parts) |
| | Thioglycolic acid (2.6 parts) | 2-Aminoethane-thiol (3.5 parts) | Succinyl peroxide (0.3 part) |
| | | α,α'-azobisiso-butyronitrile (0.2 part) | Trichloro-acetic acid (10.5 parts) |
| Polymerization conversion (%) | 100 | 100 | 95 |
| Viscosity (poises at 30° C.) | 210 | 220 | 280 |
| Number of functional groups per molecule | 2.05 | 1.9 | 2.1 |
| Type of the functional groups | Carboxyl group | Amino group* | Carboxyl group |

*Determined from the molecular weight and the Micro-Kjeldahl method.

The low molecular weight copolymers were each dehydrated in the same way as in Example 1, and reacted with each of the organic diisocyanates shown in Table 2 in the amounts shown in Table 2. The reaction temperatures and times are also shown in Table 2. The isocyanate contents of the resulting isocyanate elastomers are shown in Table 2.

TABLE 2

| | Example 3 | Example 4 | Example 5 |
|---|---|---|---|
| Formulation | Low molecular weight copolymer (100 parts) | Low molecular weight copolymer (100 parts) | Low molecular weight copolymer (100 parts) |
| | p-Xylidene diisocyanate (11.4 parts) | Hexamethylene diisocyanate (13 parts) | Diphenyl-methane diisocyanate (0.1 part) |
| | Triethylene-diamine (0.1 part) | | Dibutyltin dilaurate (0.1 part) |
| Reaction temperature (°C.) | 100 | 100 | 100 |
| Reaction time (hours) | 7 | 5 | 7 |
| Isocyanate content (%) | 2.6 | 2.8 | 2.5 |

Each of the resulting isocyanate elastomers was mixed and kneaded in accordance with the formulations shown in Table 3. The resulting composition was dehydrated to form three one-part curable elastic sealants.

TABLE 3

| | Example 3 | Example 4 | Example 5 |
|---|---|---|---|
| Formulation | Isocyanate elastomer (100 parts) | Isocyanate elastomer (100 parts) | Isocyanate elastomer (100 parts) |
| | Calcium carbonate (80 parts) | Calcium carbonate (100 parts) | Silica powder (70 parts) |
| | Titanium dioxide (10 parts) | Titanium dioxide (10 parts) | Dioctyl phthalate (15 parts) |
| | 2,6-Di(t-butyl)-p-cresol (2 parts) | Ozogard MC (*) (2 parts) | Irganox 1010 (0.5 part) |
| | Disparlon 3600N (3 parts) | Dibutyltin dilaurate (3 parts) | Carbon Powder (0.4 part) |
| | Triethylene-diamine (4 parts) | | Dibutyltin dilaurate (7 parts) |

(*)Ozone cracking inhibitor, a product of Kawaguchi Chemical Industry Co., Ltd.

The properties of each of the elastic sealants were evaluated in accordance with JIS A-5757 item 6-5 (Breezing). The results are shown in Table 4. It was seen that all of these elastic sealants had good properties as a one-part curable elastic sealant.

TABLE 4

| Test items | Example 3 | Example 4 | Example 5 |
|---|---|---|---|
| Slump (mm) | 0 | 0 | 0 |
| Contamination | none | none | none |
| Breezing | 0 | 0 | 0 |
| Ignition loss (%) | 0.1 | 0.1 | 1.0 |
| Extrudability (seconds) | 5.3 | 6.4 | 7.3 |
| Mechanical properties (measured at 20° C.) | | | |
| 50% Modulus (kg/cm$^2$) | 2.1 | 1.5 | 1.9 |
| Maximum strength (kg/cm$^2$) | 7.2 | 4.9 | 5.9 |
| Maximum elongation (%) | 610 | 810 | 700 |

As shown above, the one-part curable elastic sealant of this invention has good sealant properties. In addition, the one-part curable elastic sealant of this invention has the advantage that is has better heat stability and durability than one-part curable elastic sealants now available on the market. To show this, the one-part curable elastic sealants of Examples 3 to 5 and a commercially available urethane-type one-part curable elastic sealant prepared from polyetherpolyol, diisocyanate adduct and filler (calcium carbonate) (Comparison) were tested for heat stability and durability. The results are shown in Table 5.

TABLE 5

| | | Example 3 | Example 4 | Example 5 | Comparison |
|---|---|---|---|---|---|
| Heat stability (measured at 20° C.) | | | | | |
| Before heating | 50% Modulus (kg/cm$^2$) | 2.1 | 1.5 | 1.9 | 3.2 |
| | Maximum strength (kg/cm$^2$) | 7.2 | 4.9 | 5.9 | 6.5 |
| | Maximum elongation (%) | 610 | 810 | 700 | 630 |
| After heating | 50% Modulus (kg/cm$^2$) | 1.9 | 1.4 | 1.8 | — |
| | Maximum strength (kg/cm$^2$) | 6.8 | 4.6 | 5.5 | 2.5 |
| | Maximum elongation (%) | 620 | 850 | 720 | 26 |
| Durability* | | Metal class 1 Acceptable | Metal class 1 Acceptable | Metal class 1 Acceptable | Concrete class 2 Not accept- |

TABLE 5-continued

| Heat stability (measured at 20° C.) | Example 3 | Example 4 | Example 5 | Comparison |
|---|---|---|---|---|
|  |  |  |  | able |

*According to JIS A5757

It is seen from the above table that the one-part curable elastic sealant of this invention has far better heat stability and durability than the commercially available urethane type one-part curable elastic sealant shown as a comparison.

While the invention has been described in detail and with reference to specific embodiments thereof, it will be apparent to one skilled in the art that various changes and modifications can be made therein without departing from the spirit and scope thereof.

What is claimed is:

1. A one-part curable elastic sealant comprising a dehydrated blend of
   (I) 100 parts by weight of an acrylic isocyanate elastomer having free isocyanate groups in the molecules;
   (II) about 0.1 to 15 parts by weight of a reaction promoting catalyst, and
   (III) about 30 to 200 parts by weight of a filler; said acrylic isocyanate elastomer being the rection product of an acrylic low molecular weight copolymer with about two equivalents of an organic diisocyanate based on the functional groups in the acrylic low molecular weight copolymer, said acrylic low molecular weight copolyer being prepared by copolymerizing
   (a) an ethylenically unsaturated monomer having a functional group capable of reacting with an organic diisocyanate compound, with
   (b) an unsaturated monomer of the general formula

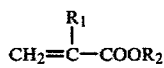

wherein $R_1$ represents a hydrogen atom or a methyl group, and $R_2$ represents a straight or branched chain alkyl group having 2 to 14 carbon atoms, in the presence of a polymerization initiator having a functional group whose reactivity with the isocyanate compound is equal to or higher than that of the functional group of the monomer (a), and/or a chain transfer agent similarly having a functional group whose reactivity with the isocyanate compound is equal to or higher than that of the functional group of monomer (a), the mole ratio of monomer (a) to monomer (b) being about 1:5 to 1:500, and the amount of said polymerization initiator and/or chain transfer agent being about 0.1 to 20 parts by weight per 100 parts of weight of monomer (b), said acrylic low molecular weight copolymer having an average of about one functional group derived from said polymerization initiator and/or chain transfer agent at the end of the polymer molecule and an average of about one functional group derived from monomer (a) at an arbitrary position within the polymer molecule, both of these functional groups being capable of participating in the reaction with the isocyanate compound.

2. The sealant of claim 1 wherein up to about 50% of the amount of the unsaturated monomer (b) is replaced by another unsaturated monomer copolymerizable with monomer (a).

3. The sealant of claim 1, wherein said functional group is selected from the group consisting of a carboxyl group, a hydroxyl group, and an amino group.

4. The sealant of claim 1, wherein said monomer (a) is selected from the group consisting of acrylic acid, methacrylic acid, maleic anhydride, 2-hydroxyethylacrylate, 2-hydroxyethylmethacrylate, 2-hydroxypropylacrylate, 2-hydroxypropylmethacrylate, polyethylene glycol acrylate, polyethylene glycol methacrylate, N-methylol acrylamide, N-methylol methacrylamide, N-methylaminoethyl acrylate, N-methylaminoethyl methacrylate, and N-t-butylaminoethyl methacrylate.

5. The sealant of claim 1, wherein $R_2$ is selected from the group consisting of ethyl, n-butyl, isobutyl, 1-ethylpropyl, 1-methylpentyl, 2-methylpentyl, 3-methylpentyl, 1-ethylbutyl, 2-ethylbutyl, isooctyl, 3,5,5-trimethylhexyl, decyl, and dodecyl.

6. The sealant of claim 2, wherein said other copolymerizable unsaturated monomer is selected from the group consisting of vinyl pyridine, vinyl ethers, acrylonitrile, methacrylonitrile, α -or β-methylene glutaronitrile, methylmethacrylate, N,N-dimethylaminoethyl acrylate, vinyl halides, butadiene, chloroprene, styrene, acrylamide, vinylpyrrolidone, cyclohexyl acrylate, glycidyl acrylate, β-ethoxyacrylate, vinyl acetate, sulfonyl acrylate, mono(2-hydroxyethyl-α-chloroacrylate) acid phosphate and fluoroalkyl acrylates.

7. The sealant of claim 1, wherein said polymerization initiator is selected from the group consisting of azobiscyanovalerianic acid, peroxyoxalic acid and azobiscyanopentanol having a carboxyl group or a hydroxyl group as the functional group.

8. The sealant of claim 1, wherein said chain transfer agent is selected from the group consisting of 2-mercaptoacetic acid, 2-mercaptoethanol, 2-aminoethane thiol and trichloroacetic acid.

9. The sealant of claim 1, wherein said diisocyanate is an aromatic, aliphatic or alicyclic organic diisocyanate.

10. The sealant of claim 9, wherein said diisocyanate is selected from the group consisting of 4,4'-diphenylmethane diisocyanate, 3,3'-dimethyl-4,4'-diphenylmethane diisocyanate, 4,4'-cyclohexylmethane diisocyanate, tolylene diisocyanate, hexamethylene diisocyanate, xylylene diisocyanate, p-phenylene diisocyanate, m-phenylene diisocyanate, 4,4'-isopropylidene dicyclohexyl diisocyanate, and isophorone diisocyanate.

11. The sealant of claim 1, wherein said sealant contains 0.05% by weight or less water based on the weight of the sealant.

12. The sealant of claim 1, wherein said reaction promoting catalyst is an organic metal compound and amine or a salt of an amine.

13. The sealant of claim 1, wherein the functional group of said polymerization initiator and said chain transfer agent is the same as the functional group in monomer (a).

14. The sealant of claim 1 wherein said acrylic isocyanate elastomer is liquid at normal temperature and pressure.

15. The sealant of claim 1 wherein said acrylic isocyanate elastomer is capable of forming a linear, crosslinked high molecular polymer upon contact with moisture.

16. The sealant of claim 14 wherein said acrylic isocyanate elastomer is capable of forming a cross-linked, linear, high molecular polymer upon contact with mositure.

17. The sealant of claim 1 wherein said acrylic low molecular weight copolymer consists essentially of monomeric units derived said monomer (a) and said monomer (b).

18. The sealant of claim 1 wherein said acrylic low molecular weight copolymer consists of monomeric units derived said monomer (a) and said monomer (b).

19. The sealant of claim 6 wherein said acrylic low molecular weight copolymer consists essentially of monomeric units derived from said monomer (a), said monomer (b) and said other copolymerizable unsaturated monomers.

20. The sealant of claim 6 wherein said acrylic low molecular weight copolymer consists of monomeric units derived from said monomer (a) said monomer (b) and said other copolymerizable unsaturated monomers.

* * * * *